United States Patent
Sekine et al.

[11] Patent Number: 5,831,805
[45] Date of Patent: *Nov. 3, 1998

[54] LOCAL POWER FAILURE DETECTION AND CLOCK DISABLING CIRCUIT

[75] Inventors: Kazutoyo Sekine, Irvine; Dan Lotocky, Fullerton, both of Calif.

[73] Assignees: Sony Corporation, Tokyo, Japan; Sony Electronics, inc., Park Ridge, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 800,258

[22] Filed: Feb. 13, 1997

[51] Int. Cl.$^6$ ........................................................ H02H 3/18
[52] U.S. Cl. ................................. 361/86; 301/65; 307/39
[58] Field of Search ................................. 361/62, 65, 86, 361/92; 307/23, 29, 36–39, 64–66; 364/483; 395/200.13, 200.15, 311, 651

[56] References Cited

U.S. PATENT DOCUMENTS

| | | | |
|---|---|---|---|
| 4,005,409 | 1/1977 | Feuer | 307/66 |
| 4,593,349 | 6/1986 | Chase et al. | 364/200 |
| 4,980,836 | 12/1990 | Carter et al. | 364/483 |
| 5,422,915 | 6/1995 | Byers et al. | 375/357 |
| 5,493,657 | 2/1996 | Van Brunt et al. | 395/308 |
| 5,668,948 | 9/1997 | Belknap et al. | 395/200.61 |

Primary Examiner—Jeffrey Gaffin
Assistant Examiner—Michael J. Sherry
Attorney, Agent, or Firm—Haverstock & Owens LLP

[57] ABSTRACT

A local power failure detection and clock disabling circuit operates within a node coupled to a bus structure. The node includes multiple ports and physical connections for supporting multiple applications. Each physical connection serves as a bus transceiver for receiving and transmitting communications over the bus structure. The node includes a local power supply and a clock signal which is provided to each of the physical connections within the node. A detection circuit is coupled to the local power supply for detecting whether or not a sufficient level of power is being supplied from the local power supply. The clock signal is always provided to a master physical connection within the node, which is responsible for repeating communications across the bus structure. The master physical connection draws power from the backup power supply source when the local power supply is not supplying a sufficient level of power. When the detection circuit has detected that the local power supply is not supplying a sufficient level of power, the clock signal is disabled to all of the physical connections within the node, except the master physical connection, in order to minimize power consumption of the node. The local applications coupled to the node are also disabled when a sufficient level of power is not supplied from the local power supply. When the detection circuit detects that the local power supply is again supplying power at a sufficient level, the clock signal is reenabled to all of the physical connections within the node and the local applications are also reenabled.

32 Claims, 6 Drawing Sheets

LOCAL POWER FAILURE DETECTION AND CLOCK DISABLING CIRCUIT

FIELD OF THE INVENTION

The present invention relates to the field of selective application of a clock signal to multiple circuits. More particularly, the present invention relates to a system which disables the clock signal to selective circuits within the system in response to a triggering event.

BACKGROUND OF THE INVENTION

Within each integrated circuit or computer system are many circuits or functional blocks which all work together to perform operations. Each synchronous circuit within the system is supplied a clock signal from either an external system clock or a local clock within the system. This clock signal is used to synchronize the operation of the integrated circuit and to toggle a response signal through the functional blocks, integrated circuit or system. For all synchronous functional blocks the clock is used as the timing reference to ensure that each synchronous functional block will execute its operations in the sequence that they are to occur.

For certain types of circuits, including CMOS circuits, power consumption is increased as a result of the circuit being exercised, e.g., by a clock signal. Typical digital systems employ multiple integrated circuit chips. As is well understood, each chip typically performs a limited number of functions for the system, for example, to control a semiconductor memory, to control a hard disk, to control a screen display, to control communications across a bus structure and other related functions. When receiving the clock signal, such circuits consume significant electric power.

The IEEE 1394 standard, "P1394 Standard For A High Performance Serial Bus," Draft 8.01v1, Jun. 16, 1995, is an international standard for implementing an inexpensive high-speed serial bus architecture which supports both asynchronous and isochronous format data transfers. The IEEE 1394 standard provides a high-speed serial bus for interconnecting digital devices thereby providing a universal I/O connection. The IEEE 1394 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. An application as used herein will refer to either an application or a device driver.

The cable specified by the IEEE 1394 standard is very thin in size compared to other bulkier cables, such as coaxial cables, used to connect such devices. Devices can be added and removed from an IEEE 1394 bus while the bus is active. If a device is so added or removed the bus will then automatically reconfigure itself for transmitting data between the then existing nodes. A node is considered a logical entity with a unique address on the bus structure. Each node provides an identification ROM, a standardized set of control registers and its own address space.

The IEEE 1394 cable environment is a network of nodes connected by point-to-point links, consisting of a port on each node's physical connection and the cable between them. The physical topology for the cable environment of an IEEE 1394 serial bus is a non-cyclic network of multiple ports, with finite branches. The primary restriction on the cable environment is that nodes must be connected together without forming any closed loops.

The IEEE 1394 cable connects ports together on different nodes. Each port includes terminators, transceivers and simple logic. A node can have multiple ports at its physical connection. The cable and ports act as bus repeaters between the nodes to simulate a single logical bus. Because each node must continuously repeat bus signals, power can be drawn by the node from power signals carried within the IEEE 1394 cable to enable the physical layer of each node to remain operational even when the local power at the node is turned off. The pair of power wires within the IEEE 1394 cable can even be used to power an entire node, without local power, if the node has modest power requirements. The signals carried on the power wires within the IEEE 1394 cable are powered from local power of the active devices on the IEEE 1394 serial bus. Accordingly, at least one of the active devices must be powered by local power.

What is needed is a clock disabling circuit which disables the clock signal to transceivers within the node in response to a triggering event, while maintaining a master physical connection to repeat bus signals for other nodes.

SUMMARY OF THE INVENTION

A local power failure detection and clock disabling circuit operates within a node coupled to a bus structure. The node includes multiple ports and physical connections for supporting multiple applications. Each physical connection serves as a bus transceiver for receiving and transmitting communications over the bus structure. The node includes a local power supply and a clock signal which is provided to each of the physical connections within the node. A detection circuit is coupled to the local power supply for detecting whether or not a sufficient level of power is being supplied from the local power supply. The clock signal is always provided to a master physical connection within the node, which is responsible for repeating communications across the bus structure. The master physical connection draws power from the backup power supply source when the local power supply is not supplying a sufficient level of power. When the detection circuit has detected that the local power supply is not supplying a sufficient level of power, the clock signal is disabled to all of the physical connections within the node, except the master physical connection, in order to minimize power consumption of the node. The local applications coupled to the node are also disabled when a sufficient level of power is not supplied from the local power supply. When the detection circuit detects that the local power supply is again supplying power at a sufficient level, the clock signal is reenabled to all of the physical connections within the node and the local applications are also reenabled.

BRIEF DESCRIPTION OF THE DRAWINGS

FIG. 1 illustrates a block diagram schematic of an overall system.

FIG. 2 illustrates a block diagram schematic of a zone within the overall system.

FIG. 3 illustrates a block diagram schematic of a seat electronics unit, within the zone of FIG. 2, which includes the local power failure detection and clock disabling circuit of the present invention.

DETAILED DESCRIPTION OF THE PREFERRED EMBODIMENT

A local power failure detection and clock disabling circuit monitors a level of an output signal from a local power supply circuit within a node system. The node system is coupled to a bus structure and includes one or more transceivers or physical connections for controlling communications between one or more local applications and other nodes coupled to the bus structure. Preferably, the bus structure is an IEEE 1394 serial bus network. A clock signal is generated within the node system and provided to each of the transceivers or physical connections. A detection circuit is coupled to the local power supply for monitoring the level of the output signal from the local power supply. When the detection circuit detects that the level of the output signal has dropped below a predetermined level, the detection circuit disables the clock signal to all of the transceivers except for a master physical connection, which is responsible for repeating communications over the bus structure for other nodes. The local applications coupled to the node are also disabled when the level of the output signal from the local power supply has dropped below the predetermined level. When a sufficient level of power is not being supplied from the local power supply, power is drawn from a backup power supply source to only power the necessary functions within the node, including the master physical connection. When the detection circuit detects that the local power supply is again supplying power at a level above the predetermined level, the clock signal is reenabled to all of the physical connections within the node. The local applications are also reenabled when the local power supply is again supplying power at a level above the predetermined level.

As used herein a node is a logical entity with a unique address on the IEEE 1394 bus structure. On other types of bus structures or networks, as used herein, a node is a component or system on the bus structure or network which is responsible for repeating communications for other components or systems on the bus structure or network. As used herein an application will refer to a device driver or software, running within a node, which performs a function or is responsible for performing a particular task or set of tasks. The term node system as used herein refers to a node and its associated components which includes at least a transceiver or physical connection for controlling communications between one or more local applications and other nodes coupled to the bus structure or network. A predetermined threshold level, as used herein, is a percentage or range of percentages of the normal power output level. A sufficient level, as used herein, refers to the level of power required to operate the components within a node or node system. It should be apparent to those skilled in the art that different nodes or different configurations of components will have different sufficient levels to meet their needs.

Figure 1A:
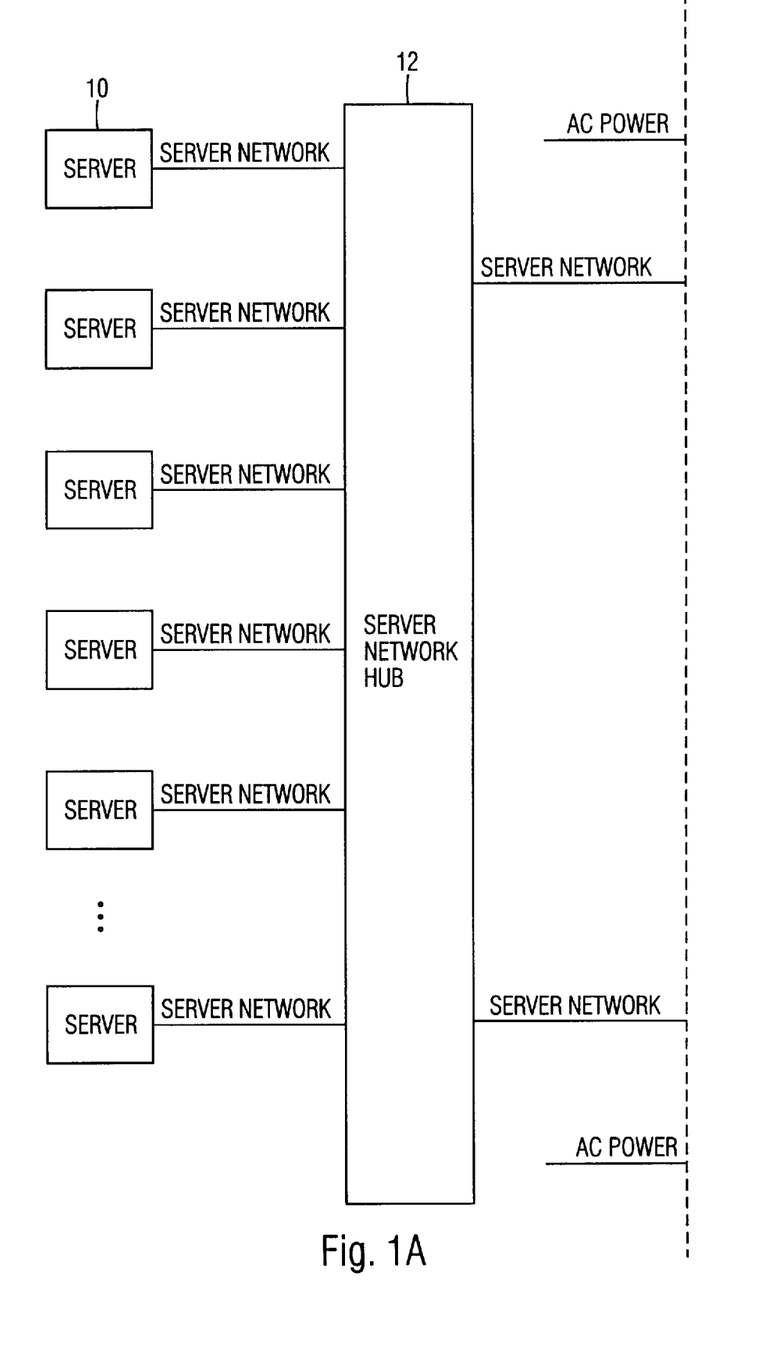
Figure 1B:
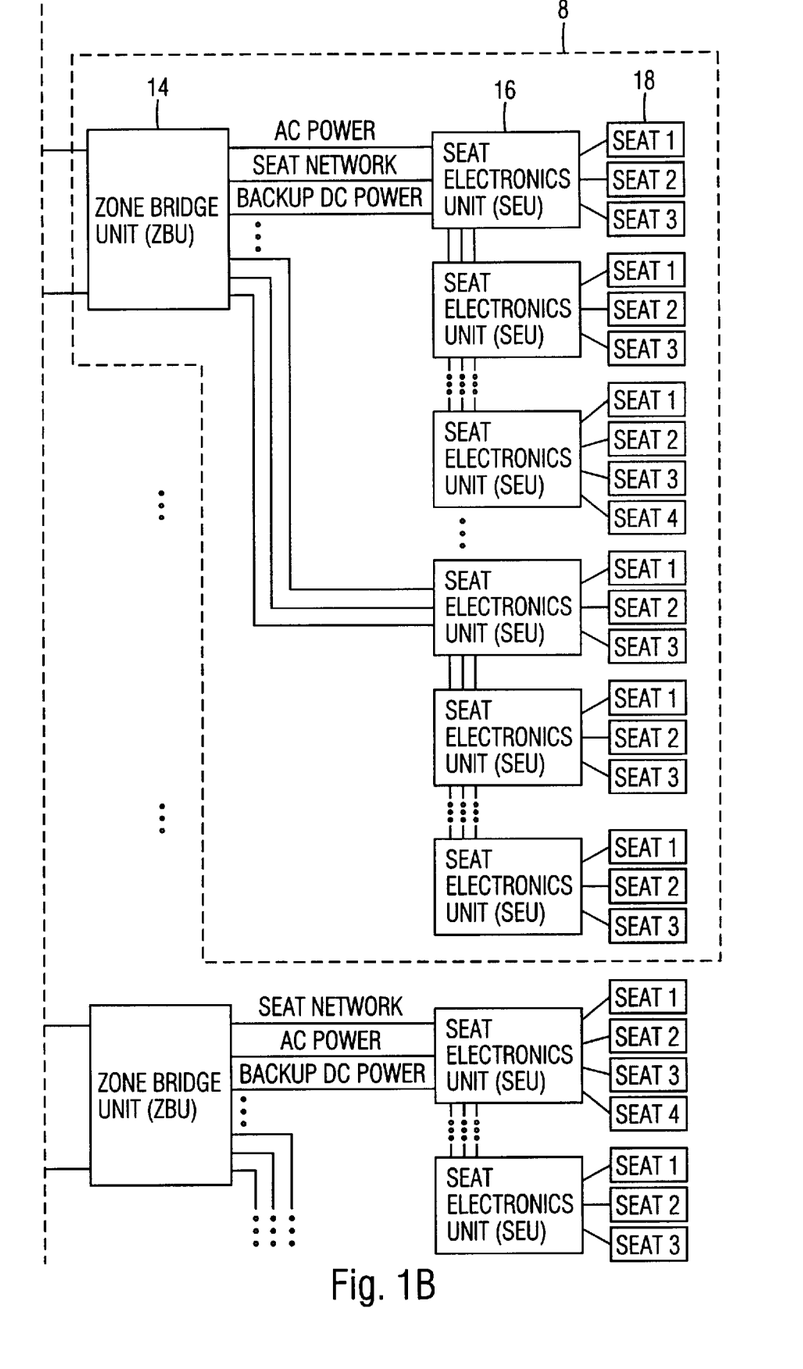

A block diagram of an overall system is illustrated in FIG. 1. The preferred embodiment of the present invention is implemented as part of an in-flight entertainment system, as taught in U.S. patent application Ser. No. 08/714,772, filed on Sep. 16, 1996, and entitled "Combined Digital Audio/ Video On Demand And Broadcast Distribution System," which is hereby incorporated by reference. Within this system, one or more servers 10 are coupled to a server network hub 12. Coupled to the server network hub 12 are one or more zone bridge units 14. The server network hub 12 is preferably an ATM switch which routes communications between the servers 10 and the zone bridge units 14. Each zone bridge unit 14 is coupled to one or more seat electronics units 16 which are each coupled to control a number of passenger control sets of seat peripherals 18. The zone bridge units 14 and the seat electronics units 16 are preferably coupled together by an IEEE 1394 serial bus network. Each seat electronics unit 16 provides a node on the bus structure and controls local applications at the passenger control sets 18. Through the passenger control sets 18, a passenger has access to one or more services such as audio and video on demand, video games, gambling, telephone service and information services. Each passenger control set of seat peripherals 18 includes a set of peripherals which allow the passenger to access the features and services available through the system. Preferably, each passenger control set 18 includes a seat video display, a passenger control unit and a passenger control handset, which are coupled for sending communications to and receiving communications from the corresponding seat electronics unit 16.

Figure 2A:
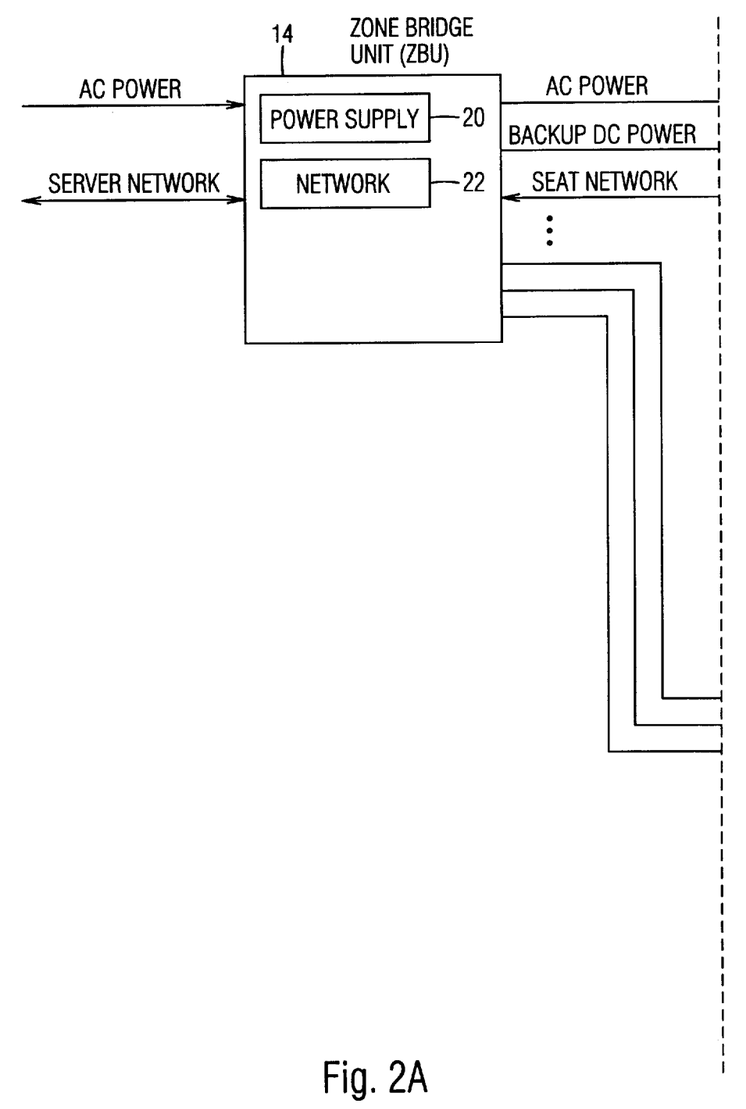
Figure 2B:
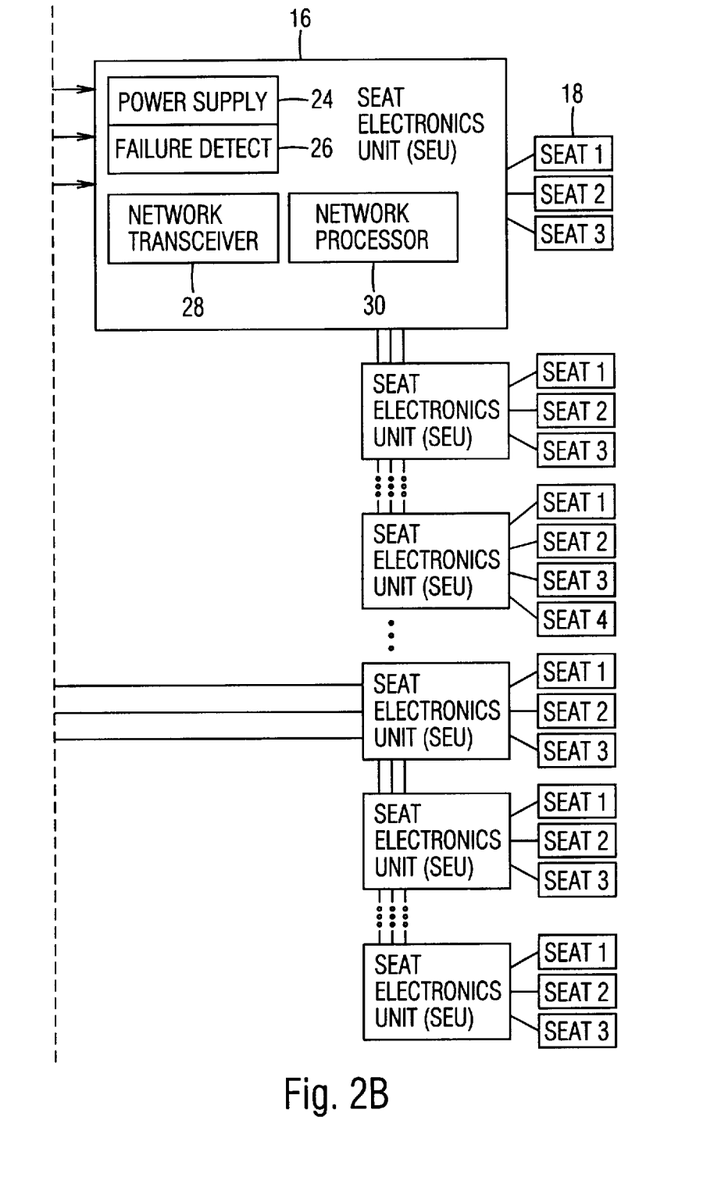

A block diagram schematic of a zone within the overall system is illustrated in FIG. 2. The zone bridge unit 14 includes a power supply 20 and a network interface 22. Each seat electronics unit 16 includes a local power supply circuit 24, a failure detect circuit 26, a node network transceiver circuit 28 and a network processor 30. Each seat electronics unit 16 is coupled to control one or more passenger control sets 18. The zone bridge unit 14 is coupled to provide AC power and backup DC power to each seat electronics unit 16 within the zone. The zone bridge unit 14 is also coupled to each seat electronics unit 16 through the seat network for controlling communications to and from the seat electronics units 16. The seat network is preferably an IEEE 1394 serial bus network. Alternatively, the seat network can be any other appropriate network or bus structure.

Figure 3A:
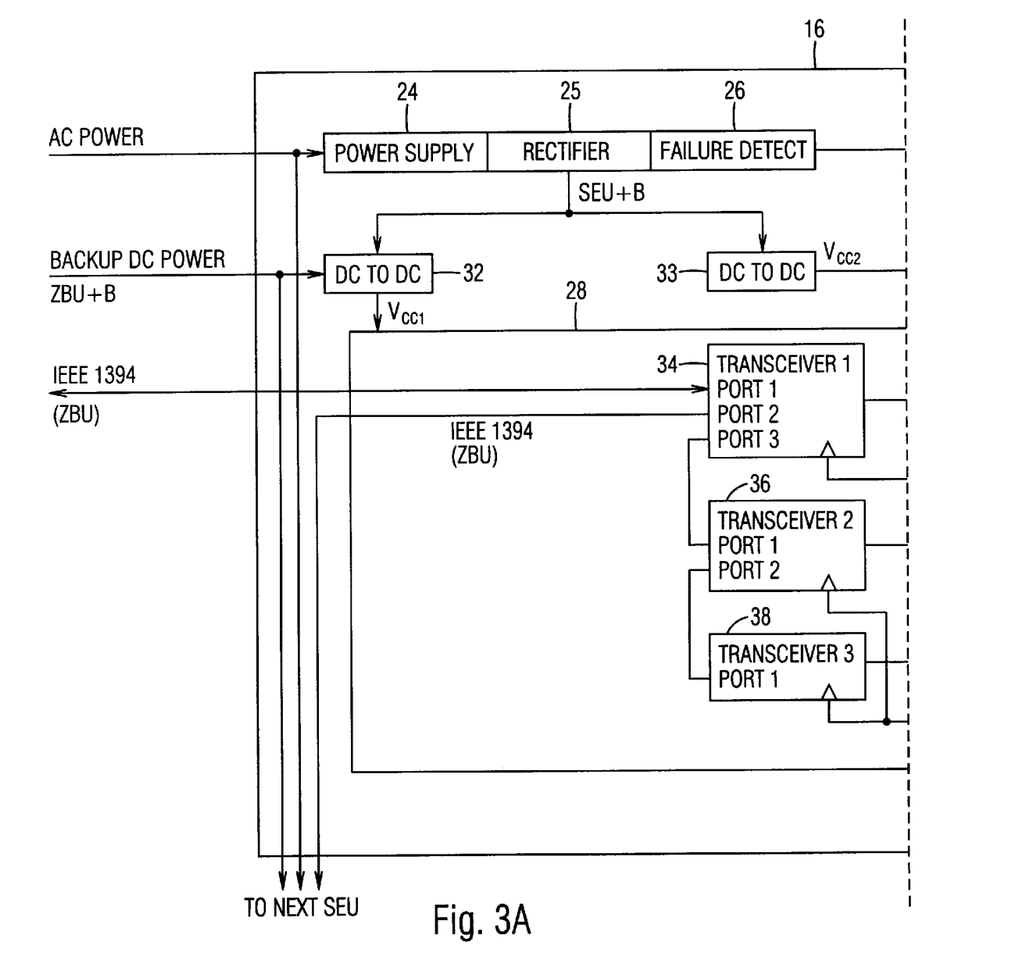
Figure 3B:
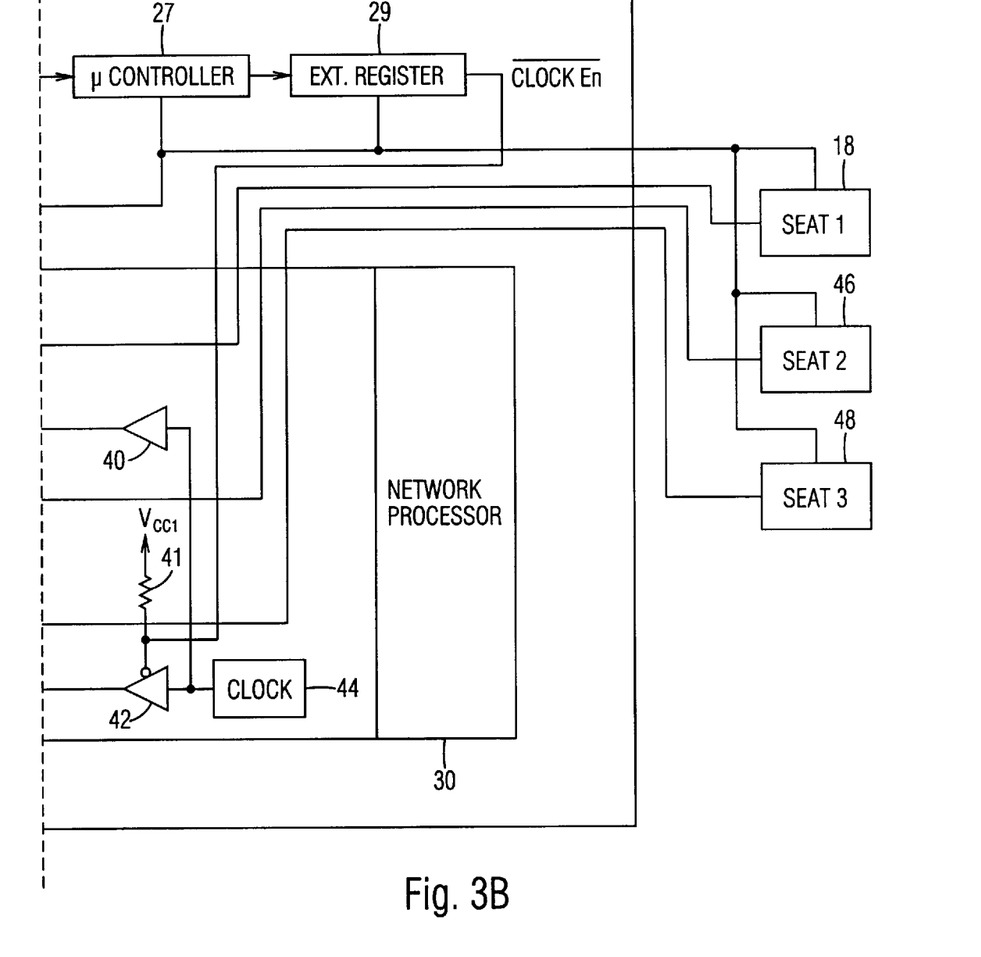

A block diagram of an illustrative seat electronics unit 16 is illustrated within FIG. 3. The AC power signal from the zone bridge unit 14 is coupled to the local power supply circuit 24 and to the next seat electronics unit. The power supply circuit includes a rectifier 25 and a failure detect circuit 26. A local power output signal SEU+B is provided from the rectifier 25. The local power output signal SEU+B is coupled to DC to DC power rectifier circuits 32 and 33. An output signal VCC2 from the DC to DC power rectifier circuit 33 is coupled to a microcontroller 27, an external register 29 and to the passenger control sets 18, 46 and 48. An output from the failure detect circuit 26 is provided to the microcontroller 27. An output from the microcontroller 27 is coupled to the external register 29. An output from the external register 29 provides the clock enable signal C l o c k En. The clock enable signal is preferably an active low signal.

The backup DC power signal ZBU+B from the zone bridge unit 14 is also coupled to the DC to DC power rectifier circuit 32 and to the next seat electronics unit. The DC to DC power rectifier circuit 32 provides the power signal VCC1 which is coupled to supply power to the network transceiver circuit 28. The DC to DC power rectifier circuit 32 draws power from the local power output signal SEU+B when the local power output signal is at a sufficient level. As described above, this sufficient level is the level of power required to operate the components within the node. Otherwise, the DC to DC power rectifier circuit 32 draws power from the backup DC power signal ZBU+B. The DC to DC power rectifier circuit 32 draws power from the back DC power signal ZBU+B using any appropriate known method, including hot standby.

As depicted, the node network transceiver circuit 28 includes three transceiver circuits 34, 36 and 38, each coupled for routing communications between a respective one of the passenger control sets 18, 46 and 48 and other nodes coupled to the IEEE 1394 bus structure. It should be apparent to those skilled in the art that while three passenger control sets are illustrated, other numbers of passenger control sets can be implemented under the principles of the present invention. The first transceiver circuit 34 routes signals to and from the first passenger control set 18, as well as passing signals between the bus structure and the second and third transceiver circuits 36 and 38. The second transceiver circuit 36 routes signals to and from the second passenger control set 46, as well as passing signals between the bus structure and the third transceiver 38. The third transceiver circuit 38 routes signals to and from the third passenger control set 48.

Here, the IEEE 1394 bus structure from the zone bridge unit 14 is coupled to a first port of the first transceiver circuit 34. The IEEE 1394 bus structure is coupled from a second port of the first transceiver circuit to the next seat electronics unit within the zone. The first transceiver circuit 34 is the master transceiver circuit and is responsible for repeating communications across the IEEE 1394 bus structure, between other nodes on the IEEE 1394 bus structure. The first transceiver circuit also controls communications between the first passenger control set 18 and other nodes on the IEEE 1394 bus structure.

In the depicted embodiment, a third port of the first transceiver circuit 34 is coupled to a first port of the second transceiver circuit 36 for passing signals between the second and third transceiver circuits 36 and 38 and the bus structure. Thus, signals transmitted between the second and third transceiver circuits 36 and 38 and other nodes on the IEEE 1394 bus structure are routed through the first transceiver 34. A second port of the second transceiver circuit 36 is coupled to a first port of the third transceiver circuit 38 for passing signals between the third transceiver circuit 38 and the bus structure. Thus, signals transmitted between the third transceiver circuit 38 and other nodes on the IEEE 1394 bus structure are routed through both the first and second transceiver circuits 34 and 36. The second transceiver circuit 36 also controls communications between the second passenger control set 46 and other nodes on the IEEE 1394 bus structure. The third transceiver circuit 38 also controls communications between the passenger control set 48 and other nodes on the IEEE 1394 bus structure.

A clock signal is generated by an oscillator circuit 44 within the network transceiver circuit 28. The clock signal is coupled to an input of a buffer 40 and to an input of a buffer 42. An output of the buffer 40 is coupled to a clock input of the first transceiver 34 for providing the clock signal to the first transceiver 34. An output of the buffer 42 is coupled to a clock input of the second and third transceivers 36 and 38 for providing the clock signal to the second and third transceivers 36 and 38. The buffers 40 and 42 are used to drive the clock signal and provide it to the transceiver circuits 34, 36 and 38. The failure detect circuit 26 is coupled to monitor the level of the local power output signal SEU+B provided from the rectifier 25. The failure detect circuit 26 provides a signal to the microcontroller 27 based on the level of the local power output signal SEU+B. The microcontroller 27 then in turn provides a signal to the external register 29 which provides the clock enable signal $\overline{Clock\,En}$ to the buffer 42 based on the control signal received from the microcontroller 27. The clock enable signal $\overline{Clock\,En}$ is an active low signal and correspondingly the buffer 42 includes an inverter on its control input. The control input of the buffer 42 is coupled to receive the clock enable signal $\overline{Clock\,En}$ and to a first terminal of a pullup resistor 41. A second terminal of the pullup resistor 41 is coupled to receive the power signal VCC1 output from the DC to DC power rectifier circuit 32.

If the failure detect circuit 26 detects that the local power output signal SEU+B is below a predetermined threshold level, the buffer 42 is disabled and the clock signal is not provided to the second and third transceivers 36 and 38. If the failure detect circuit detects that the local power output signal SEU+B is above the predetermined threshold level, the buffer 42 is enabled and the clock signal is provided to the second and third transceivers 36 and 38. The buffer 40 is always enabled and the clock signal is therefore always provided to the first transceiver circuit 34, during operation of the seat electronics unit 16.

Preferably, the failure detect circuit 26 provides a detection signal to the microcontroller 27 when the local power output signal SEU+B falls to a level which is ninety percent (90%) of its normal output level. When the microcontroller 27 receives this detection signal, the microcontroller 27 preferably waits for a time period of 50 milliseconds. After the waiting period of 50 milliseconds is over and the level of the local power output signal SEU+B is still below the threshold level of ninety percent (90%) of its normal output level, the microcontroller 27 will set the external register 29 which pulls the clock enable signal $\overline{Clock\,En}$ to a logical high voltage level. When the clock enable signal $\overline{Clock\,En}$ rises to a logical high voltage level, the buffer 42 is disabled and the clock signal is not provided to the second and third transceivers 36 and 38.

The microcontroller 27 preferably sets a software timer to measure the 50 millisecond waiting period before the clock signal is disabled to the second and third transceivers 36 and 38. The time period of 50 milliseconds is preferably used because once the local power supply signal SEU+B falls below the preferred predetermined threshold level of ninety percent (90%) of its normal output level, it will typically take at least 50 milliseconds before the output VCC2 of the DC to DC power rectifier circuit 33 will fall to a level which would not provide sufficient power to operate the second and third transceiver circuits 36 and 38. If the output VCC2 of the DC to DC power rectifier circuit 33 falls to an insufficient level before the end of the waiting period, the clock signal is disabled to the second and third transceiver circuits 36 and 38 when the output VCC2 of the DC to DC power rectifier circuit 33 reaches that insufficient level. When the output VCC2 of the DC to DC power rectifier circuit 33 falls to an insufficient level before the end of the waiting period, the external register 29 loses its power supply, which causes the clock enable signal $\overline{Clock\,En}$ to go to a tri-state level. When the clock enable signal $\overline{Clock\,En}$ is at a tri-state level, the buffer 42 is disabled due to the voltage VCC1 and the pullup resistor 41. A person of ordinary skill in the art could determine preferred power levels and corresponding delay times for other specific configurations of components. These values are generally in the range of 85 to 95 percent and 40 to 100 milliseconds.

The passenger control sets 18, 46 and 48 are only operational when the local power supply 24 is supplying a level of power above the predetermined threshold level. When the local power supply 24 is supplying a sufficient level of power, the DC to DC rectifier circuit 32 supplies power to the network transceiver circuit 28 using the local power output signal SEU+B. The failure detect circuit 26 detects that the local power output signal SEU+B is at a level above the predetermined threshold level and accordingly does not send the detection signal to the microcontroller 27. When the local power output signal SEU+B is at a level above the predetermined threshold level, the microcontroller 27 will not set the external register 29 and the clock enable signal $\overline{Clock\,En}$ is therefore at a logical low voltage level which enables the buffer 42. The clock signal from the oscillator circuit 44 is therefore provided to each of the first, second and third transceivers 34, 36 and 38 within the network transceiver circuit 28. The passenger control sets 18, 46 and 48 are operational when the output VCC2 of the DC to DC power rectifier circuit 33 is at a sufficient level. Signals between the passenger control sets 18, 46 and 48 and other nodes on the bus structure are routed through the appropriate one of the transceiver circuits 34, 36 or 38.

The passenger control sets 18, 46 and 48 are not operational when the local power supply 24 is supplying a level of power below the predetermined threshold level. When the local power output signal SEU+B falls below the predetermined threshold level and the waiting period is over, the clock signal from the oscillator 44 is only provided to the first transceiver 34, through the buffer 40. When the failure detect circuit 26 detects that the local power output signal SEU+B is below the predetermined threshold level, the detection signal is provided from the failure detect circuit 26 to the microcontroller 27. After the waiting period, the microcontroller 27 then sets the external register 29 which pulls the clock enable signal $\overline{\text{Clock En}}$ to a logical high voltage level and disables the buffer 42. When the buffer 42 is disabled, the clock signal is not provided to the second and third transceiver circuits 36 and 38. The clock signal is only provided to the first transceiver circuit 34, through the buffer 40, in order to allow the first transceiver circuit 34 to repeat the signals across the IEEE 1394 bus structure for other nodes on the IEEE 1394 bus structure. The node network transceiver circuit 28 is supplied power from the DC to DC rectifier circuit 32, which draws power from the backup DC power signal ZBU+B from the zone bridge unit 14, when the local power supply signal SEU+B is at a level below the predetermined threshold level. The second and third transceiver circuits 36 and 38 draw very little power during this time when they are not being provided the clock signal from the oscillator 44.

Signals received at the first port of the first transceiver 34 are repeated on the bus structure from the second port of the first transceiver 34. Correspondingly, signals received at the second port of the first transceiver 34 are repeated on the bus structure from the first port of the first transceiver 34.

As soon as the failure detect circuit 26 detects that the local power output signal SEU+B is again at a level above the predetermined threshold level, the external register 29 is reset thereby pulling the clock enable signal $\overline{\text{Clock En}}$ to a logical low voltage level, the buffer 42 is enabled and the clock signal is provided to the second and third transceiver circuits 36 and 38. The passenger control sets 18, 46 and 48 are also operational when the output VCC2 of the DC to DC power rectifier circuit 33 is at a sufficient level. The DC to DC rectifier circuit 32 will again use the local power output signal SEU+B to provide power to the node network transceiver circuit 28.

By disabling the clock signal to the second and third transceiver circuits 36 and 38 when the local power output signal SEU+B is at a level below the predetermined threshold level, the second and third transceiver circuits 36 and 38 will draw very little power from the backup DC power signal ZBU+B. Accordingly, power will be conserved when the DC to DC rectifier circuit 32 is using the backup DC power signal ZBU+B to supply power to the node network transceiver circuit 28. During this time, only the necessary function of repeating signals on the IEEE 1394 serial bus for other nodes on the bus structure, is performed by the first transceiver circuit 34. This minimizes the amount of power drawn by the node network transceiver circuit 28 while still supporting communications between other nodes on the bus structure. Accordingly, when the local power supply circuit 24 fails to provide a sufficient level of power, for any reason, only the minimum functions necessary to repeat signals on the bus structure, are maintained by the network transceiver circuit 26, using the backup DC power signal ZBU+B from the zone bridge unit 14. During this time, the clock signal from the oscillator circuit 44 is not provided to the second and third transceiver circuits 36 and 38 in order to conserve power. As soon as the local power supply output signal SEU+B is at a level above the predetermined threshold level, the clock signal is reenabled to the second and third transceiver circuits 36 and 38, allowing them to control communications between the appropriate passenger control sets and the bus structure.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it should be apparent to those skilled in the art that the local power failure detection and clock disabling circuit of the present invention could be included within other types of systems. For example, the local power failure detection and clock disabling circuit of the present invention can be included in any node on a bus system or network which is responsible for repeating signals between other nodes on the network. While the preferred embodiment of the local power failure detection and clock disabling circuit of the present invention is used within an aircraft passenger in-flight entertainment system, it should also be apparent that the local power failure detection and clock disabling circuit can also be included in other transportation modes such as trains, busses, ferries and cruise ships. It should also be apparent that while an IEEE 1394 bus structure has been described as the preferred connection between the zone bridge units 14 and the seat electronics units 16, that other bus structures or networks could be used to couple the zone bridge units 14 and the seat electronics units 16 together.

We claim:

1. A local power failure detection and clock disabling circuit for providing power and a clock signal to a first circuit and one or more additional circuits within a system, the local power failure detection and clock disabling circuit comprising a detection circuit configured for monitoring a local power supply signal and for disabling the clock signal to the one or more additional circuits when the local power supply signal is below a threshold level, wherein the clock signal is not disabled to the first circuit when the local power supply signal is below the threshold level.

2. The local power failure detection and clock disabling circuit as claimed in claim 1 wherein the clock signal is provided to the one or more additional circuits through a buffer which is disabled by the detection circuit when the local power supply signal is below the threshold level.

3. The local power failure detection and clock disabling circuit as claimed in claim 2 wherein the first circuit is provided power from a backup power signal when the local power supply signal is below a sufficient level.

4. A method of providing a clock signal to a first circuit and one or more additional circuits within a system, comprising the steps of:

monitoring a local power signal level from a local power supply within the system;

providing a clock signal to the first circuit;

providing the clock signal to the one or more additional circuits when the local power signal level is above a threshold level; and disabling the clock signal to the one or more additional circuits, but not the first circuit, when the local power signal level is below the threshold level.

5. The method as claimed in claim 4 further comprising the step of drawing backup power from a backup source to power the first circuit when the local power signal level is below the threshold level.

6. The method as claimed in claim 5 wherein the system is a node on a bus structure, the first circuit is a master transceiver circuit for repeating communications between other nodes on the bus structure and the one or more additional circuits are transceiver circuits, and further wherein each of the master transceiver circuit and the one or more additional circuits are coupled to a local application and communications are routed between the local application and other nodes on the bus structure.

7. The method as claimed in claim 6 wherein the local applications are disabled when the local power signal level is below the threshold level.

8. The method as claimed in claim 7 wherein the bus structure is an IEEE 1394 serial bus network.

9. The method as claimed in claim 8 wherein the threshold level is ninety percent of a normal level of the local power signal.

10. The method as claimed in claim 4 further comprising the step of waiting a time period after the power signal level falls below the threshold before completing the step of disabling.

11. A local power failure detection and clock disabling circuit for providing power and a clock signal to a node on a bus structure, the node including a master transceiver circuit for repeating communications between other nodes on the bus structure and one or more additional transceiver circuits, each transceiver circuit coupled to a local application and to the master transceiver for routing communications between the local application and other nodes on the bus structure through the master transceiver circuit, each transceiver circuit also receiving a clock signal, the local power failure detection and clock disabling circuit comprising:

a. means for monitoring a local power signal level, the local power signal for providing power to the node; and b. means for disabling the clock signal to the one or more additional transceiver circuits when the local power signal level is below a threshold level.

12. The local power failure detection and clock disabling circuit as claimed in claim 11 wherein the clock signal is provided to the one or more additional transceiver circuits through a buffer which is disabled by the means for disabling when the local power signal level is below the threshold level.

13. The local power failure detection and clock disabling circuit as claimed in claim 12 wherein the local applications are also disabled when the local power signal level is below the threshold level.

14. The local power failure detection and clock disabling circuit as claimed in claim 13 wherein the master transceiver circuit is provided power from a backup power signal when the local power signal level is below a sufficient level for repeating communications between other nodes on the bus structure.

15. A node on a bus structure comprising:

a. a first transceiver circuit configured for repeating communications between other nodes on the bus structure and for routing communications between at least a local application coupled to the node and other nodes on the bus structure;

b. one or more additional transceiver circuits coupled to the first transceiver circuit and each configured for routing communications between a corresponding local application and other nodes on the bus structure;

c. a power supply circuit for supplying power to the node from a selective one of a local power supply signal and a backup power supply signal;

d. an oscillating circuit coupled to the first transceiver circuit and the one or more additional transceiver circuits for providing a clock signal to the transceiver circuits; and e. a detection circuit configured for monitoring the local power supply signal and for disabling the clock signal to the one or more additional transceiver circuits when the local power supply signal is below a threshold level.

16. The node as claimed in claim 15 wherein the local applications are also disabled when the local power signal is below the threshold level.

17. The node as claimed in claim 16 wherein the power supply circuit supplies power to the node from the backup power supply signal if the local power supply signal is not at a sufficient level.

18. The node as claimed in claim 17 wherein the clock signal is provided to the one or more additional transceiver circuits through a buffer which is disabled by the detection circuit when the local power supply signal is below the threshold level.

19. The node as claimed in claim 18 wherein the bus structure is an IEEE 1394 serial bus network.

20. A node on a bus structure comprising:

a. a first transceiver circuit configured for repeating communications between other nodes on the bus structure and for routing communications between local applications coupled to the node and other nodes on the bus structure;

b. one or more additional transceiver circuits coupled to the first transceiver circuit and each configured for routing communications between a corresponding local application and other nodes on the bus structure;

c. a power supply circuit for supplying power to the node from a selective one of a local power supply signal and a backup power supply signal;

d. an oscillating circuit coupled to the first transceiver circuit and the one or more additional transceiver circuits for providing a clock signal to the transceiver circuits; and e. a local power failure detection and clock disabling circuit including:

i. a monitoring circuit for monitoring a level of the local power supply signal; and ii. a disabling circuit coupled to the monitoring circuit and to the oscillating circuit for disabling the clock signal to the one or more additional transceiver circuits when the local power signal level is below a threshold level.

21. The node as claimed in claim 20 wherein the power supply circuit supplies power to the node from the backup power supply signal when the local power supply signal is not at a sufficient level.

22. The node as claimed in claim 21 wherein the local applications are disabled when the local power signal level is below the threshold level.

23. The node as claimed in claim 22 wherein the disabling circuit includes a buffer through which the clock signal is provided to the one or more additional transceiver circuits.

24. The node as claimed in claim 23 wherein the buffer is disabled when the local power signal level is below the threshold level.

25. The node as claimed in claim 24 wherein the bus structure is an IEEE 1394 serial bus network.

26. An inflight entertainment system for providing content upon request to one or more users wherein the content is partitioned into a plurality of content programs, the system comprising:
   a. one or more passenger peripheral sets coupled together to form a first network, each passenger peripheral set for accessing the content programs;
   b. one or more media servers for storing the content programs;
   c. a routing device coupled to the media servers, thereby forming a second network, and to the passenger peripheral sets for routing content programs and control communications between the media servers and the passenger peripheral sets over the first and second networks;
   d. a media controller coupled to the media servers and to the routing device for controlling and scheduling communications from the media servers to the passenger peripheral sets; and
   e. a plurality of nodes each coupled to one or more passenger peripheral sets and to the routing device for routing communications between the passenger peripheral sets within the first network and the media servers within the second network, each node including:
      i. a first transceiver circuit configured for repeating communications between other nodes on the network and for routing communications between the passenger peripheral sets coupled to the node and other nodes on the network;
      ii. one or more additional transceiver circuits coupled to the first transceiver circuit, each configured for routing communications between a corresponding local application and other nodes on the network;
      iii. a power supply circuit for supplying power to the node from a selective one of a local power supply signal and a backup power supply signal;
      iv. an oscillating circuit coupled to the first transceiver circuit and the additional transceiver circuits for providing a clock signal to the transceiver circuits; and
      v. a detection circuit configured for monitoring the local power supply signal and for disabling the clock signal to the additional transceiver circuits when the local power supply signal is below a threshold level.

27. The inflight entertainment system as claimed in claim 26 wherein each passenger control set includes a display, an audio output and an input device for entering controls.

28. The inflight entertainment system as claimed in claim 26 wherein the first network is an IEEE 1394 serial bus network.

29. The inflight entertainment system as claimed in claim 28 wherein the second network is an ATM network coupled together by fibre optic cables.

30. The inflight entertainment system as claimed in claim 26 wherein the passenger peripheral sets coupled to the node are disabled when the local power supply signal is below the threshold level.

31. The inflight entertainment system as claimed in claim 30 wherein the power supply circuit supplies power to the node from the backup power supply signal if the local power supply signal is not at a sufficient level.

32. The inflight entertainment system as claimed in claim 31 wherein the clock signal is provided to the one or more additional transceiver circuits through a buffer which is disabled by the detection circuit when the local power supply signal is below the threshold level.

* * * * *

UNITED STATES PATENT AND TRADEMARK OFFICE
CERTIFICATE OF CORRECTION

PATENT NO. : 5,831,805
DATED : November 3, 1998
INVENTOR(S) : Sekine et al.

It is certified that error appears in the above-identified patent and that said Letters Patent is hereby corrected as shown below:

On the title page, in item [73] Assignees, delete "Sony Electronics, inc., Park Ridge, N.J." and insert --Sony Trans Com, Inc., Irvine, Calif.--.

Column 4, on line 57, delete "back" and insert --backup--.

Signed and Sealed this

Twenty-eighth Day of September, 1999

*Attest:*

Q. TODD DICKINSON

*Attesting Officer*    *Acting Commissioner of Patents and Trademarks*